US009878257B2

(12) United States Patent
Barrett et al.

(10) Patent No.: US 9,878,257 B2
(45) Date of Patent: Jan. 30, 2018

(54) AERIAL VEHICLES AND METHODS OF USE

(71) Applicant: University of Kansas, Lawrence, KS (US)

(72) Inventors: Ronald M. Barrett, Lawrence, KS (US); Robert B. Honea, Lenoir City, TN (US); Richard B. Bramlette, Little Rock, AR (US)

(73) Assignee: University of Kansas, Lawrence, KS (US)

( * ) Notice: Subject to any disclaimer, the term of this patent is extended or adjusted under 35 U.S.C. 154(b) by 207 days.

(21) Appl. No.: 14/734,864

(22) Filed: Jun. 9, 2015

(65) Prior Publication Data

US 2016/0016652 A1    Jan. 21, 2016

Related U.S. Application Data

(63) Continuation-in-part of application No. 14/120,446, filed on Jun. 10, 2014, now abandoned, and a
(Continued)

(51) Int. Cl.
*A63H 27/00* (2006.01)
*B64C 25/06* (2006.01)
(Continued)

(52) U.S. Cl.
CPC ............ *A63H 27/12* (2013.01); *A63H 27/02* (2013.01); *A63H 33/003* (2013.01); *B64C 25/06* (2013.01);
(Continued)

(58) Field of Classification Search
CPC ................ B64C 29/02; B64C 29/0025; B64C 2201/088; B64C 2201/108; A63H 17/00;
(Continued)

(56) References Cited

U.S. PATENT DOCUMENTS 2,678,783 A    5/1954  Myers
2,712,420 A *  7/1955  Amster ............... B64C 29/0091
                                              244/100 R
(Continued)

FOREIGN PATENT DOCUMENTS

CN        10205022         5/2011
WO    WO 2013/048339       4/2013
WO    WO 2014/055899       4/2014

OTHER PUBLICATIONS

U.S. Appl. No. 29/574,073, filed Aug. 11, 2016, Barrett et al.
(Continued)

*Primary Examiner* — Joseph W Sanderson
(74) *Attorney, Agent, or Firm* — Ray Quinney & Nebeker, P.C.; Paul N. Taylor

(57) ABSTRACT

An aerial vehicle capable of convertible flight from hover to linear flight includes a body having a longitudinal body axis, a plurality of forward wings, a plurality of aft wings, at least one motor, and at least three aerodynamic propulsors driven by the at least one motor. Each forward wing extends a forward wing plane. Each aft wing extends from an aft wing plane. The aerodynamic propulsors are mounted longitudinally between the plurality of forward wings and plurality of aft wings.

18 Claims, 14 Drawing Sheets

Related U.S. Application Data continuation-in-part of application No. 14/120,447, filed on Jun. 20, 2014, now abandoned.

(51) Int. Cl.

| | | |
|---|---|---|
| *B64D 27/02* | (2006.01) | |
| *A63H 33/00* | (2006.01) | |
| *B64C 29/02* | (2006.01) | |
| *B64C 39/02* | (2006.01) | |

(52) U.S. Cl.
CPC ............ *B64C 29/02* (2013.01); *B64C 39/024* (2013.01); *B64D 27/02* (2013.01); *B64C 2201/021* (2013.01); *B64C 2201/104* (2013.01); *B64C 2201/108* (2013.01); *B64C 2201/128* (2013.01); *B64C 2203/00* (2013.01)

(58) Field of Classification Search
CPC ........ A63H 17/26; A63H 27/00; A63H 27/02; A63H 27/12
See application file for complete search history.

(56) References Cited

U.S. PATENT DOCUMENTS

| | | | |
|---|---|---|---|
| D176,461 S | 12/1955 | Jackson | |
| D178,252 S | 7/1956 | Lent | |
| D181,599 S | 12/1957 | Nelson et al. | |
| 2,845,746 A | 8/1958 | McKinney | |
| D184,193 S | 12/1958 | Peterson et al. | |
| D184,209 S | 1/1959 | Bell et al. | |
| 2,927,747 A * | 3/1960 | Bennie | B64C 25/52 244/17.17 |
| 3,029,047 A * | 4/1962 | Jacobsen | B64C 1/063 244/17.11 |
| 3,063,375 A | 11/1962 | Hawley et al. | |
| 3,302,908 A * | 2/1967 | Lazareff | B64C 29/0091 244/115 |
| 3,578,263 A | 5/1971 | Gunter et al. | |
| 3,884,431 A | 5/1975 | Burrell | |
| D250,966 S | 1/1979 | Spore | |
| D251,454 S | 3/1979 | Takahashi | |
| D258,672 S | 3/1981 | Butcher | |
| D290,101 S | 6/1987 | Chung | |
| 4,779,534 A | 10/1988 | Wang | |
| 5,060,886 A | 10/1991 | Davis et al. | |
| 5,082,079 A | 1/1992 | Lissaman et al. | |
| 5,114,096 A * | 5/1992 | Wernicke | B64C 29/02 244/45 A |
| 5,289,994 A | 3/1994 | Del Campo Aguilera | |
| D346,844 S | 5/1994 | D'Andrade | |
| D351,432 S | 10/1994 | Dudeck et al. | |
| D353,414 S | 12/1994 | Crane | |
| D377,326 S | 1/1997 | Grossman et al. | |
| D380,236 S | 6/1997 | Kupperman | |
| D438,914 S | 3/2001 | O'Rourke et al. | |
| 6,260,796 B1 | 7/2001 | Klingensmith | |
| 6,464,166 B1 * | 10/2002 | Yoeli | B64C 29/0025 244/12.1 |
| 6,502,787 B1 | 1/2003 | Barrett | |
| D474,237 S | 5/2003 | Levine | |
| D486,777 S | 2/2004 | Schell | |
| 6,694,230 B2 * | 2/2004 | Kubica | B64C 13/18 244/76 R |
| D500,809 S | 1/2005 | Mc Kenna et al. | |
| D503,140 S | 3/2005 | Blevio, Sr. | |
| D509,261 S | 9/2005 | Tebbe | |
| 7,226,017 B2 * | 6/2007 | Blevio, Sr. | B64C 25/32 244/1 R |
| 7,416,466 B2 | 8/2008 | Isawa | |
| D589,868 S | 4/2009 | Matharan et al. | |
| 7,601,046 B2 | 10/2009 | Chang | |
| D624,971 S | 10/2010 | Cohen et al. | |
| D627,235 S | 11/2010 | Lo et al. | |
| 7,874,513 B1 | 1/2011 | Smith | |
| 8,393,564 B2 * | 3/2013 | Kroo | B64C 3/56 244/17.23 |
| D679,339 S | 4/2013 | Genovese | |
| D679,340 S | 4/2013 | Genovese | |
| 8,485,464 B2 * | 7/2013 | Kroo | B64C 3/16 244/17.23 |
| D697,145 S | 1/2014 | Wong | |
| 8,690,096 B2 * | 4/2014 | Alvarez | B64C 3/10 244/17.11 |
| D761,920 S | 7/2016 | Fargeau et al. | |
| D778,821 S | 2/2017 | Broadhurst, IV et al. | |
| 2002/0002428 A1 * | 1/2002 | Kubica | B64C 13/18 701/11 |
| 2002/0030142 A1 | 3/2002 | James | |
| 2005/0009440 A1 | 1/2005 | Foster et al. | |
| 2006/0038061 A1 | 2/2006 | Blevio, Sr. | |
| 2006/0113425 A1 * | 6/2006 | Rader | B64C 15/00 244/17.11 |
| 2008/0274664 A1 | 11/2008 | Adamonis et al. | |
| 2010/0152933 A1 | 6/2010 | Smoot et al. | |
| 2010/0252690 A1 | 10/2010 | Hothi et al. | |
| 2011/0001020 A1 | 1/2011 | Forgac | |
| 2011/0031355 A1 * | 2/2011 | Alvarez | B64C 3/10 244/7 R |
| 2011/0042509 A1 | 2/2011 | Bevirt et al. | |
| 2011/0168835 A1 | 7/2011 | Oliver | |
| 2011/0226892 A1 | 9/2011 | Crowther et al. | |
| 2012/0012692 A1 * | 1/2012 | Kroo | B64C 3/56 244/6 |
| 2012/0286102 A1 | 11/2012 | Sinha et al. | |
| 2013/0020429 A1 * | 1/2013 | Kroo | B64C 3/16 244/6 |
| 2014/0117149 A1 | 5/2014 | Zhou et al. | |
| 2014/0131507 A1 | 5/2014 | Kalantari et al. | |
| 2014/0131510 A1 | 5/2014 | Wang et al. | |
| 2014/0319266 A1 | 10/2014 | Moschetta et al. | |
| 2015/0191246 A1 | 7/2015 | Kalantari et al. | |
| 2016/0009381 A1 | 1/2016 | Benatar et al. | |
| 2016/0023743 A1 * | 1/2016 | Barrett | G09F 21/08 244/119 |
| 2016/0023759 A1 * | 1/2016 | Barrett | A63H 27/12 244/17.23 |
| 2016/0375997 A1 * | 12/2016 | Welsh | B64C 29/0025 244/17.23 |

OTHER PUBLICATIONS

U.S. Appl. No. 29/529,811, dated May 23, 2016, Office Action.
U.S. Appl. No. 29/529,811, dated Sep. 2, 2016, Notice of Allowance.
U.S. Appl. No. 14/120,446, filed Jun. 10, 2014, Barrett et al.
U.S. Appl. No. 14/120,447, filed Jun. 20, 2014, Barrett et al.
U.S. Appl. No. 14/120,448, filed Jun. 24, 2014, Barrett et al.
U.S. Appl. No. 14/120,449, filed Jul. 25, 2014, Barrett et al.
U.S. Appl. No. 14/734,885, filed Jun. 9, 2015, Barrett et al.
U.S. Appl. No. 14/810,090, filed Jul. 27, 2015, Barrett et al.
U.S. Appl. No. 29/529,811, filed Jun. 10, 2015, Barrett et al.
U.S. Appl. No. 29/529,831, filed Jun. 10, 2015, Barrett et al.
U.S. Appl. No. 29/546,239, filed Nov. 20, 2015, Barrett et al.
Leishman, J. G., "Principles of Helicopter Aerodynamics," Cambridge University Press, New York, NY, USA 2000.
U.S. Appl. No. 29/546,239, dated Sep. 27, 2017, Restriction Requirement.
U.S. Appl. No. 29/590,923, dated Sep. 28, 2017, Restriction Requirement.

* cited by examiner

AERIAL VEHICLES AND METHODS OF USE

This application is a continuation in part of U.S. patent application Ser. No. 14/120,446, filed Jun. 10, 2014, and entitled "REMOTE-CONTROLLED CONVERTIBLE MULTI-PROPELLER TOY" This application is a continuation in part of U.S. patent application Ser No. 14/120,447, filed Jun. 20, 2014, and entitled "AERIAL VEHICLES AND METHODS OF USE" the disclosures of which are incorporated herein by reference.

BACKGROUND

1. Field of the Disclosure (Technical Field)

The disclosure is concerned with aerial vehicles. More particularly, pertains to a class of flying toys which are able to hover like helicopters, then convert and fly like airplanes using a plurality of propellers and wings for lift and flight control.

2. Background Art

For more than two centuries, multi-propeller aircraft have been experimented with, starting with the fabled toy of Launoy and Bienvenu of 1783. These devices were and are limited mostly to hover-type flight modes, flying at low speeds for limited endurances and distances. Airplanes and gliders have similarly been in existence for many hundreds of years, flying much faster with greater endurances and range.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, an aerial vehicle includes a body, at least one motor supported by the body, and at least three aerodynamic propulsors driven by the at least one motor. The body includes a plurality of forward wings and a plurality of aft wings extending away from a longitudinal axis of the body. The plurality of forward wings extends in a forward wing plane that contains the longitudinal body axis and is tilted no more than 15 degrees from the longitudinal body axis. The plurality of aft wings extends in a forward wing plane that contains the longitudinal body axis and is tilted no more than 15 degrees from the longitudinal body axis. The at least three aerodynamic propulsors are positioned longitudinally between the plurality of forward wings and plurality of aft wings.

In another embodiment, an aerial vehicle includes a body, at least three aerodynamic propulsors each driven by a motor, a communication module, and a flight director. The body includes a plurality of forward wings and a plurality of aft wings extending away from a longitudinal axis of the body. The plurality of forward wings extends in a forward wing plane that contains the longitudinal body axis and is tilted no more than 15 degrees from the longitudinal body axis. The plurality of aft wings extends in a forward wing plane that contains the longitudinal body axis and is tilted no more than 15 degrees from the longitudinal body axis. The at least three aerodynamic propulsors are positioned longitudinally between the plurality of forward wings and plurality of aft wings. The flight director is in data communication with at least one of the motors associated with the at least three aerodynamic propulsors and has a stability augmentation system configured to receive flight state information and pilot commands and to output flight control commands based at least partially upon the flight state information and pilot commands.

In yet another embodiment, an aerial vehicle includes a body, at least three aerodynamic propulsors each driven by a motor, a communication module, and a flight director. The body includes a plurality of forward wings and a plurality of aft wings extending away from a longitudinal axis of the body. The plurality of forward wings extends in a forward wing plane that contains the longitudinal body axis and is tilted no more than 15 degrees from the longitudinal body axis. The plurality of forward wings includes a structural leading edge that is configured to structurally support landing gear and extends through a radially outwardmost point of the aerial vehicle. The plurality of aft wings extends in a forward wing plane that contains the longitudinal body axis and is tilted no more than 15 degrees from the longitudinal body axis. The at least three aerodynamic propulsors are positioned longitudinally between the plurality of forward wings and plurality of aft wings and within the radially outwardmost point such that the structural leading edge forms a propulsor cage that provides protection for the aerodynamic propulsors from impact. The flight director is in data communication with at least one of the motors associated with the at least three aerodynamic propulsors and has a stability augmentation system configured to receive flight state information and pilot commands and to output flight control commands based at least partially upon the flight state information and pilot commands.

Additional features of embodiments of the disclosure will be set forth in the description which follows, and in part will be obvious from the description, or may be learned by the practice of such embodiments. The features of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other advantages and features of the disclosure can be obtained, a more particular description will be rendered by reference to specific embodiments thereof which are illustrated in the appended drawings. For better understanding, like elements have been designated by like reference numbers throughout the various accompanying figures. Though some elements in some figures have the same reference number as elements in other figures, these elements may be the same or may differ. While some of the drawings are schematic representations of concepts, at least some of the drawings may be drawn to scale. Understanding that these drawings depict only typical embodiments of the disclosure and are not therefore to be considered limiting of its scope, the embodiments will be described and explained with additional specificity and detail through the use of the accompanying drawings in which.

DETAILED DESCRIPTION

Figure 1:
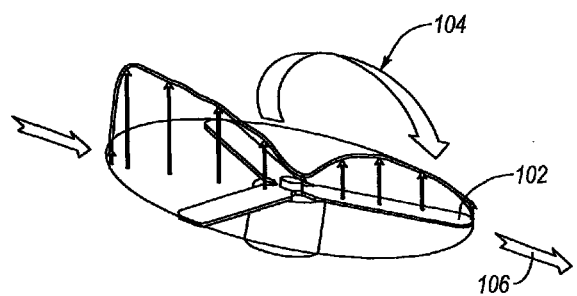
FIG. 1 illustrates an example of the physics of the pitchback instability coupled with cross-flow drag problems which plague open-propeller and shrouded-propeller aerial vehicle designs.

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. It should be understood that any directions or reference frames in the preceding description are merely relative directions or movements. For example, any references to "up" and "down" or "above" and "below" or "forward" and "aft" are merely descriptive of the relative position or movement of the related elements. Any element described in relation to an embodiment or a figure herein may be combinable with any element of any other embodiment or figure described herein.

This disclosure generally relates to aerial vehicles. This disclosure relates to aerial vehicles with multiple aerodynamic propulsors that are capable of flight convertible from a hover flight to an airplane-type or translational flight mode. Multi-propeller aerial vehicles are susceptible to being disturbed by gust fields via pitchback instabilities and large cross-flow drag levels when in hovering flight. This tendency for instability increases the probability of a crash, which, in turn, often leads to vehicle breakage and/or harm to bystanders.

A more debilitating crash mode which is not readily apparent is related to wall-suction. As a hovering aerial vehicle approaches a vertical surface, especially one which is close to the ground, a toroidal vortex is established in the form of a recirculation donut. This recirculation zone generates a strong downwash field on the wall-side of the propellers, thereby reducing lift and pitching the propeller-craft towards the wall. This almost always leads to a crash. One solution to catastrophic propeller breakage is to install propeller guards. However, propeller guards lead to high weight increments and even greater pitchback instabilities and crossflow drag when in freeflight, when exposed to a gust and close to walls. The translational problem is weakly dealt with by pitching the aircraft into the local gust field. While sometimes effective, the response time is often slow and leads to gross body rotations which disturb camera views which are often used for piloting via First Person View (FPV) systems.

While aerial vehicles which can fly like helicopters are accepted by the market and toys that can fly like airplanes are similarly desirable, it is clear that an aerial vehicle which possesses the best of both flight modes can be more desirable than either one individually. At least one embodiment described herein is capable of both hovering and airplanelike translational flight (i.e., applying thrust in a direction that is generally parallel to the ground for an extended period of time). In at least one embodiment described herein, an aerial vehicle achieves improved hover performance like a helicopter and yet maintains the ability to execute fully acrobatic maneuvers like a high performance airplane. In general, aircraft that are good at airplane-type flight have very limited hover maneuverability and are susceptible to lateral gusts when in a hover, are often flipped over when in hover modes and are unable to land without catastrophic wing, empennage, fuselage and/or propeller strike. Aerial vehicles which are good at hovering and low-speed flight often have such tremendous levels of drag when in high speed flight that they cannot even begin to reach conventional airplane or toy airplane speeds.

There are five main challenges of conventional multi-propeller aircraft which may feed into each other, including aerodynamic instabilities due to propeller pitchback and/or crossflow drag; flight near hard surfaces and/or objects; toroidal recirculation near vertical surfaces and/or objects; exacerbation of instability by thrust-based navigation; and wall suction leading to body rotations. For example, as shown in FIG. 1, a propeller 102 may experience pitchback instabilities 104 and crossflow drag 106 that induce large body rotational and spatial excursions (i.e., deviations from intended flight pattern or direction) in the propeller 102 or in hovering vehicles that employ the propeller 102 when flying in real atmospheric conditions. These excursions often lead to crashes unto themselves against hard objects, the ceiling, the ground, or people, resulting in harm to individuals and/or damage to the vehicle and surrounding environment.

Figure 2:
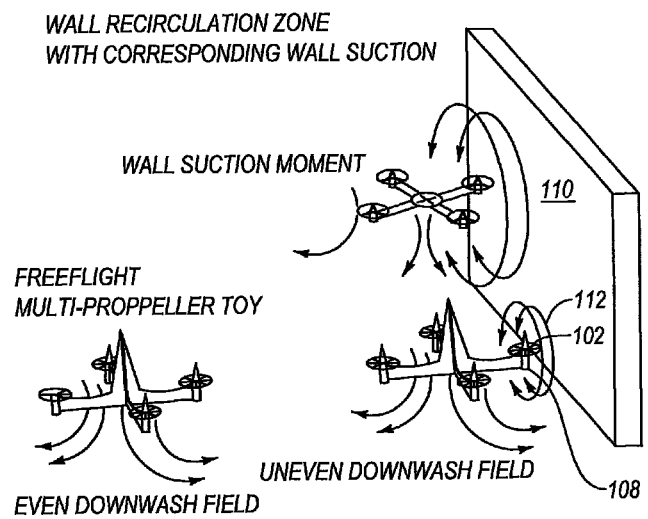
FIG. 2 illustrates the wall recirculation zone with resulting wall suction moments.

Further, as shown in FIG. 2, the excursions may place a vehicle 108 employing the propeller 102 in the proximity of a vertical surface 110 (like the side of a house or wall) where a toroidal recirculation zone 112, induces a high level of downwash on the propeller 102 or vehicle 108 propeller-side closest to the vertical surface 110, which in turn sucks the vehicle 108 towards the vertical surface 110 or wall. The toroidal recirculation zone 112 may lead to vehicle 108 instabilities, which may be exacerbated by attempts to stabilize the vehicle 108. For example, if a hovering vehicle 108 relies only upon thrust to escape the wall suction, then often, as wall-side thrust is increased (either by the pilot or a flight controller), the strength of the toroidal recirculation zone 112 and its suction correspondingly increases as adverse downwash velocities grow. Such toroidal recirculation zone 112 suction at or near vertical surfaces 110 may induce both wall-side rotation and translation, which may in turn frequently induce crashes, disturb camera angles via body rotations, lead to mechanical breakage, and, in flight close to people, can even harm individuals.

The most common design feature on aerial vehicles that is used to prevent catastrophic propeller damage is the addition of a propeller guard. While effective in preventing some damage, propeller guards are heavy and, through their very geometry, may induce even greater levels of the crossflow drag and pitchback instability described in relation to FIG. 1. Occasionally, large training cross-arms are added to the landing gear at the bottom of the aircraft, thereby allowing the user to learn how to fly the aircraft. While protecting the aircraft from downward strikes, the aircraft can be easily flipped over when close to the ground, inducing propeller damage. Cross-arms are exceedingly heavy and draggy as they lie directly in the propwash close to the ground, which compromises maneuverability. As used herein, "draggy" should be understood to describe one or more features of a vehicle that increase the aerodynamic drag of the vehicle. The comparatively high weight of cross-arms also leads to a net downward shift in center of gravity which exacerbates pendulum instabilities.

Figure 3:
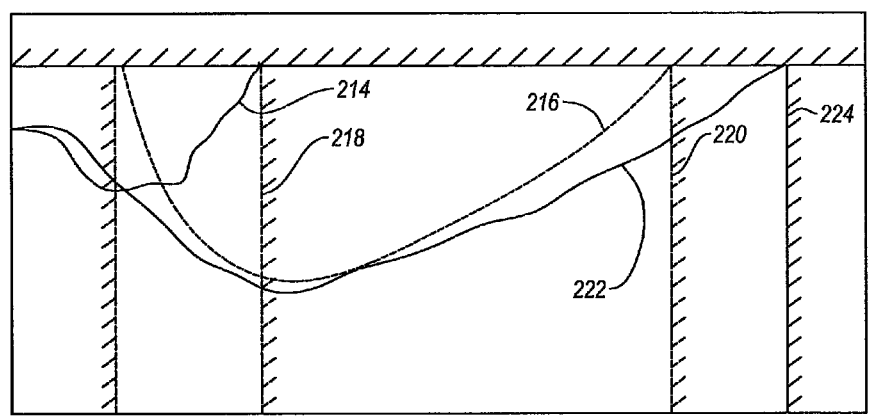
FIG. 3 is a comparison of energy requirements of a convertible aerial vehicle versus conventional helicopter and airplane designs.

FIG. 3 illustrates that if a given aircraft with a fixed amount of maximum power is flown in a helicopter-like (hover) configuration, it will have a reasonable hover required-power but will have a comparatively low helicopter maximum translational flight speed 218, which is determined when the helicopter required-power line 214 intersects the available power line. Similarly, the airplane required-power line 216 is dominated by stall-related effects at low speeds leading to an airplane minimum speed. Like helicopters, the airplane required-power line will intersect at a given available power line, which determines the airplane maximum translational flight speed 220, which is much higher than the helicopter maximum translational flight speed 218.

At least one embodiment of a convertible aerial vehicle described herein displays a convertible required-power line 222 that lacks the stall speed constraint of an airplane which sets wing areas to high levels. Instead, the wings of the convertible aircraft can be significantly smaller. This, in turn, leads to a dramatic reduction in wetted area (i.e., the area of atmosphere through which the vehicle moves) which decreases total flat plate equivalent drag, f. Because f of the convertible aerial vehicle is much lower than that of a similarly powered airplane, a simple relationship governing the convertible maximum translational flight speed 224 of the aircraft makes the relationship clear. Given two otherwise identical designs, the one with a lower value of equivalent flat plate area will be faster:

$$\sqrt[3]{\frac{2\eta_p P_{sav}}{\rho\left(f + \frac{C_L^2}{\pi A e}\right)}} = V_{max} \quad \text{(eq. 1)}$$

Wherein: $\eta_p$ is the propeller efficiency, $P_{sav}$ is the shaft power available, $\rho$ is the density of air, f is the parasite area of the aircraft, $C_L$ is the lift coefficient of the lifting surface, A is the aspect ratio of the lifting surface, and e is the Oswald's efficiency of the lifting surface.

If one assumes that the design will fly at the maximum value of lift-to-drag for greatest efficiency, via tailoring wing areas for maximum efficiency cruise speed then equation 1 becomes:

$$\sqrt[3]{\frac{\eta_p P_{sav}}{\rho f}} = V_{max} \quad \text{(eq. 2)}$$

Accordingly, as wing areas are reduced because of the relaxation or elimination of stall constraints, the convertible aerial vehicle will be able to either go faster with the same size powerplant and/or achieve the same top speed with a smaller motor.

FIG. 3 illustrates a potential opportunity presented by a synergistically designed convertible aerial vehicle. An embodiment of a synergistically designed convertible aerial vehicle may hover with system-level Figure of Merit (FOM) similar to or greater than that of a helicopter and then convert to a translational flight mode for high speed flight (which is typically two to five times greater than the highest speeds that can be achieved by a conventional helicopter), then convert back to hover flight for, in one example, landing. In another example, the translational flight may include flight generated by one or more propulsors that lies mostly in a horizontal plane and is close to the primary direction of flight. In conventional, commercial aircraft, jet engines are typically tilted less than 15° from the body longitudinal axis, which in turn is typically oriented within 15° of a horizontal plane for most of the flight and principally in the direction of flight, which coincides with the direction stability axis. Other examples of airplane mode flight include that which is achieved by gliders as noted by the direction of flight as coinciding with the x-direction stability axis in still-air conditions with no propulsors present. Aircraft which possess translational flight capability typically have one or more thrust generating mechanisms which generate propulsive thrust principally parallel to the aircraft longitudinal axis, which possesses the lowest levels of cross-flow drag in a given flight mode, which for conventional aircraft is the body x-axis.

Convertible aerial vehicle have historically been able to achieve higher speeds than helicopters while maintaining some form of hover flight capability. At least one embodiment of an aerial vehicle disclosed herein, however, promises to have even greater hover efficiency by boosting system-level Figures of Merit by 2% to 5% over a helicopter. At least one embodiment of a convertible aircraft described herein generates strong airflows along its body-x axis in hovering flight, which is tilted approximately 90° to the horizontal, and the body-x axis is the axis of lowest drag presentation. The total crossflow drag is, therefore, mitigated with respect to helicopters. Another pair of features reducing drag along the body longitudinal axis are the comparatively low wetted area and the form factor. This low wetted area is an artifact of the relaxation of stall constraints which allows lifting surfaces to shrink with respect to the sizes required for takeoff and landing required by airplanes. With shrunken lifting surfaces, the low wetted areas present much lower drag than that caused by much larger wings which are typically found on conventional aircraft of the same weight.

Although the present disclosure may describe embodiments in terms of toy embodiments, the present disclosure is not so limited. Rather, principles and elements of the disclosure apply to aerial vehicles generally. For example, at least one aerial vehicle herein may be used in a larger-scale aerial vehicle, such as an unmanned aerial vehicle. These unmanned aerial vehicles may include the following ranges of size: from 2 centimeters (cm) to 5 meters (m) in main propeller diameters. Furthermore, although most embodiments are described in terms of having propellers, other aerodynamic propulsors may be used. For example, in some embodiments a ducted fan, small jet engine, rocket engine, other aerodynamic propulsor, or combinations thereof may be used.

Figure 4:
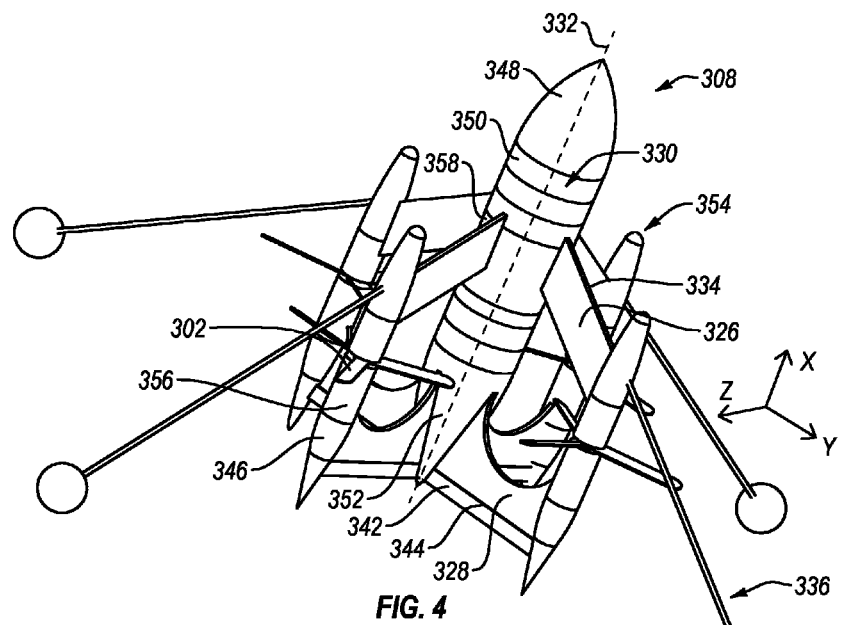
FIG. 4 is a perspective view of an embodiment of a convertible aerial vehicle, according to the present disclosure.

Referring now to FIG. 4, an aerial vehicle 308 according to the present disclosure may include propellers 302 that may be mounted between a forward wing set 326 and an aft wing set 328; neither at the front, nor at the back of the aircraft. The forward wing set 326 and aft wing set 328 may be mounted to a central body 330 having a longitudinal body axis 332 extending therethrough. The central body 330 may include at least one bay which may be of any cross-sectional geometry or size and may house things like batteries, receiver and/or transmitter electronics, sensors, general cargo, or combinations thereof.

The mounting position of the propellers 302 may allow the vehicle 308 to shield the propellers 302 from objects above (i.e., in the longitudinal axis 332 of the body 302— including tree branches or light fixtures as the aircraft is caught in a ceiling suction toroid) or below. In some embodiments, the leading edge 334 of the forward wing set 326 may be both structural and load-bearing to the point that they accommodate a protective undercarriage assembly 336 which both ties into and/or forms the vehicle 308 primary structure. The undercarriage assembly 336 may be positioned in and/or attached to the forward portion of the vehicle 308 rather than the aft portion of the vehicle 308, which may reduce or remove any destabilizing shift in center of gravity.

Legs 338 of the undercarriage assembly 336 and/or propeller cages may extend beyond the radial outermost point of the propellers 302, thereby shielding the propellers 302 from damage in the event of a rough landing or crash. Similarly, should the vehicle 308 fly into a person or other object, shielding the propellers 302 may reduce or eliminate the probability of striking an individual with the propellers 302 and/or the probability of an injury in the event of a strike may be reduced.

Unlike a propeller guard surrounding a propeller, which may generate pitchback instabilities and crossflow drag increments as described in relation to FIG. 1, an undercarriage assembly 336 may generate a pitchforward stabilizing increment as the aerodynamic center lies below the propeller 302 planes and center of gravity of the vehicle 308. When combined with a plurality of landing pads 340 located on the undercarriage assembly 336 radially and distally away from the body 330, the crossflow drag of the landing pads 340 may further accentuate stabilizing pitchforward moments. The landing pads 340 may be connected to the undercarriage assembly 336 using a connection of variable compliance to allow tunable damping, compliance, and energy absorption upon landing or obstacle strike.

In embodiments with an undercarriage assembly 336, the aerial vehicle 308 may be increased in structural strength by fixing the undercarriage assembly 336 directly into the forward wing set 326 primary structure while possessing extremely low levels of wetted area and form drag as it presents a low-drag aerodynamic profile. Because of the low wetted area increments, the crossflow drag may be between one to three orders of magnitude less than a propeller guard in hover. In forward flight, the geometry of the undercarriage assembly 336 is such that the low wetted area increments mean that the corresponding equivalent flat plate drag increment may also be an order of magnitude lower than that of a propeller guard. In embodiments where the undercarriage assembly 336 is positioned far upstream of the propeller 302, the translational flight drag may be further reduced as the dynamic pressure ratio at that location is approximately 1.0. Propeller guards of conventional aircraft generally operate at substantially higher dynamic pressure ratios which drives up their drag increments (typically due to scrubbing drag) even further relative to an undercarriage assembly 336 arrangement, especially considering that their form drag is high as well as wetted area.

In some embodiments, the aerial vehicle 308 may include turning vane flaps 342 movable relative to the aft wing set 328 by a hinge 344 or other pivoting connection. The turning vane flaps 342 may lie below the propellers 302 and firmly in the propeller slipstreams. This orientation may facilitate execution of full pitch, roll and yaw control moments about the center of gravity. In some embodiments, when the control deflections and associated degrees of freedom of the turning vane flaps 342 are combined with motor control degrees of freedom, at least one of the embodiments of an aerial vehicle 308 may easily execute rotation-free translations and execute body-level stationkeeping even in the presence of high gust fields. The aircraft may be kept in moment equilibrium with the deck level in hovering flight while turning vanes apply net forces along the transverse body axes in either direction. Longitudinal body axis 332 position control may be maintained via propeller thrust manipulation coming from speed and/or blade feathering angle variations.

In embodiments with propeller shielding and/or translational control aspects of the design (i.e., turning vane flaps 342), at least one embodiment of an aerial vehicle 308 will maintain extremely high levels of pitch control authority useful for conversion between hover and translational flight modes and maintenance of flight stability in the transition corridor. Specifically, pitch control may be executed independently and collectively via variations of the thrust between the propellers 302 which are displaced from each other in the transverse direction relative to the body 330 (i.e. fuselage) as well as turning vane flap 342 deflections, which generate elevator-equivalent pitching moments.

Movement of the aerial vehicle 308 may be defined relative to an x-, y-, and z-axis reference frame as depicted in FIG. 4. The x-direction may be parallel to the longitudinal axis 332 of the vehicle 308 and the x- and y-directions may be transverse directions perpendicular to one another. Roll control about the x-axis may be established in at least one embodiment by differential speed control of propellers 302 and/or turning vane flap 342 deflections. Yaw control about the body 330 z-axis may be similarly controlled by differential speed control of the propellers 302 displaced laterally along the body 330 y-axis and/or turning vane flap 342 deflections which generate rudder-equivalent moments about the body 330 z-axis.

Translational control along y- and z-axes of the aerial vehicle 308 may be provided by maintaining moment equilibrium about the two axes via thrust manipulation from the propellers 302 while simultaneously executing rudder-equivalent and/or elevator-equivalent turning vane flap 342 deflections. Translational control along the x-axis may be obtained by direct thrust variations via speed control of the propellers 302. In at least one embodiment of an aerial vehicle 308 disclosed herein, the control aspects may include as many as eleven degrees of freedom. Embodiments with higher number of wing pairs in the forward wing set 326 and the aft wing set 328 and/or propellers 302 may possess even higher numbers of degrees of freedom.

At least one embodiment of an aerial vehicle 308 incorporates an overall configuration which is extremely low drag in converted, translational flight, which synergistically lends efficient hover properties as well. Multi-propeller aerial vehicles typically use truss or round-bar arm designs to support the propellers 302. The support arms create non-trivial crossflow blockage drag, as the support arms sit directly below the propeller in the high dynamic pressure region of the flow. At least one embodiment of an aerial vehicle according to the present disclosure excludes support arms and/or may include aerodynamic fairings 346 immediate behind the propellers 302, where the fairings 346 may be fixed to the aft wing set 328. The drag associated with support arms may be unacceptable in convertible flight (i.e., flight from hover to translational flight). Accordingly, the total blockage drag of the design may be one to two orders of magnitude lower in a hover and at certain boattail heights above the ground may actually produce lifting thrust. Embodiments of aerial vehicles 308 without truss or round-bar support arms directly below the propeller may lead to overall hover efficiencies which are significantly greater than conventional multi-propeller toys and even conventional helicopter toys. As a result, in these embodiments, the total power required to hover will be reduced, which in turn, may shrink battery sizes relative to the other designs, which lowers weight, component, and manufacturing costs.

Because the takeoff weight to empty weight sensitivities of multi-propeller toys is typically high when dimensions are small, at least one embodiment of an aerial vehicle toy includes this beneficial property, which shrinks gross weights. Because the weights of the embodiments having this design will be lower than a conventionally configured aerial vehicle, it will not only cost less, but it will tend to be much more robust as inertial loads during object strike will be lower and product safety will be similarly enhanced beyond just those levels which are provided by the unique undercarriage assembly 336. Relative to a conventionally configured helicopter, propeller torque is exactingly countered, not by a tail rotor which consumes 10% 15% of the main rotor power, but by balancing lifting propellers 302, which counter torque with no parasitic losses such as seen in a conventionally configured helicopter.

As shown in FIG. 4, the aerial vehicle 308 may include a nose 348 that can be of an aerodynamically faired configuration allowing smooth passage of air in both hover and translational flight modes and may have holes or slots allowing for induction of an internal airflow to cool internal electronics and batteries. A number of storage bays 350 may be included, that may hold a variety of devices from stability augmentation systems to sensors to general cargo to energy storage devices. The aerial vehicle 308 may include an aft body portion 352. In some embodiments, the aft body portion 352 can house a variety of mission packages and/or cargo. In other embodiments, the aft body portion 352 can be substantially empty to maintain proper weight and balance distributions of the aerial vehicle 308 as a whole.

The aerial vehicle 308 may include one or more powerpods 354. In some embodiments, the one or more powerpods 354 may have a comparatively high aspect ratio configuration (i.e., ratio of a longitudinal dimension to a transverse dimension) and may support propellers 302 structurally from the front and back while passing structural loads through the motor shaft via, for example, bearing assemblies. The propellers 302 may be foldable, flexible, frangible and/or deformable for packaging, flight safety and robustness. At least one motor 356 may provide shaft power to the propellers 302 to turn them in a variety of directions and speeds depending on the number of wings and associated powerpod 354 assemblies. The aerial vehicle 308 may include the fairings 346. In some embodiments, the fairings 346 may act as structural supports for the at least one motor 356 and/or termina of the aft wing set 328, undercarriage assembly 336, alighting assemblies, other structural or shielding components, or combinations thereof. The aerial vehicle 308 may include forward wing set 326 that may support the forward sections of the powerpods 354 structurally by passing structural loads directly to a forward body portion 358.

As described herein, the aerial vehicle 308 may include landing gear, such as the undercarriage assembly 336 with legs 338 and landing pads 340. The forward wing set 326 may integrate the landing gear and pass landing loads from the undercarriage assembly 336 directly to the forward wing set 326 primary structures. The aerial vehicle 308 may include an aft wing set 328 that may structurally connect the powerpods 354 to the aft body portion 352. The forward wing set 326 and the aft wing set 328 may contain a variety of structural members and/or electrical lines to sustain and/or control flight. The aft wing set 328 may structurally support turning vane flaps 342.

Figure 5:
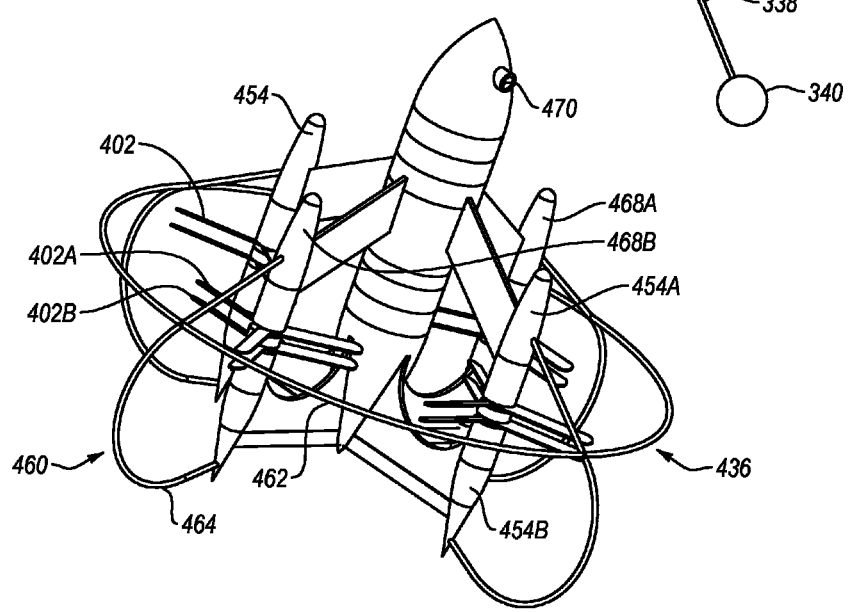
FIG. 5 is a perspective view of an embodiment of a convertible aerial vehicle having a propeller cage, according to the present disclosure.

FIG. 5 illustrates another embodiment of an aerial vehicle 408 having a configuration with more than one set of propellers 402 per powerpod 454 which may be rotated in the same or opposite directions. The propellers 402A, 402B may be driven by motors in both the forward and aft portions of the powerpods 454A, 454B. The undercarriage assembly 436 may be amenable to the formation of a propeller cage 460 or protective basket which may allow for safe flight to protect the propellers 402 from obstacles and similarly protect the object or people from the propellers 402. The vertical basket arches 462 may connect to a basket hoop 464 which may fully enclose the propellers 402 in a low-drag configuration. The aerial vehicle 408 can also be equipped with binocular sensors like pinhole cameras 468A, 468B which may be laterally displaced to offer an operator both parallax and depth perception via displacement along the body y-axis. The aerial vehicle 408 can also be equipped with monocular sensors 470 mounted on pan-tilt-zoom assemblies in any portion of the aerial vehicle 408. Antennae of a variety of configurations may be mounted on any portion of the aerial vehicle 408 and/or incorporated into the body 430 or undercarriage assembly 436. In some embodiments, an aerial vehicle may be flown in first person via a vision aided system, leading to a first-person view (FPV) piloting scheme. An aerial vehicle may be flown by waypoint navigation scheme, third-person flight modes, arcade or a hybrid of any of the above.

Figure 6:
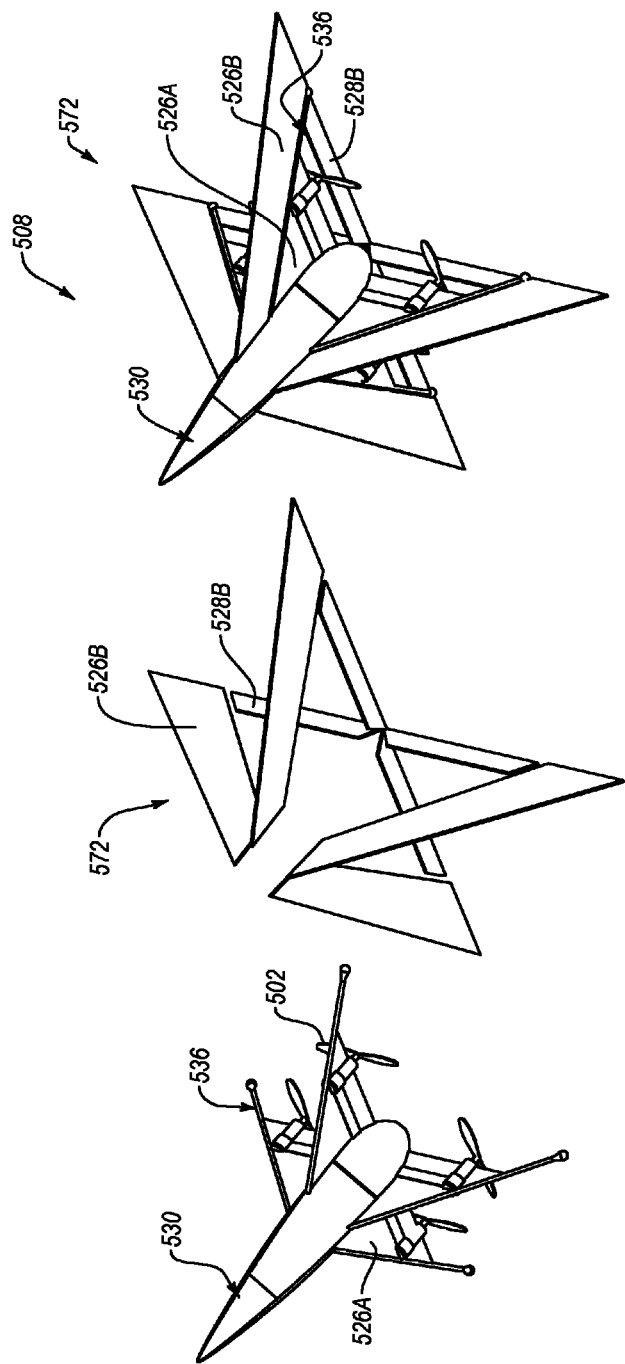
FIG. 6 is a perspective view of an embodiment of a convertible aerial vehicle with removable training wings in an assembled and disassembled form, according to the present disclosure.

FIG. 6 illustrates an embodiment of an aerial vehicle 508 that is a conversion training variant which may include a number of features which assist in stabilizing conversions between hover flight and translational flight. The aerial vehicle 508 may include a removable training wing set 572 configured to supplement the wing sets of the aerial vehicle 508. In some embodiments, the aerial vehicle 508 may have a forward wing set 526A connected to the body 530 and mounted forward of the propellers 502. The forward wing set 526A may be structurally supported by an undercarriage assembly 536 that extends radially and aftwardly, at least partially defining the leading edge of the forward wing set 526A. The removable training wing set 572 may include a relatively large training forward wing set 526B that is configured to connect to the body 530 and/or the leading edge of the forward wing set 526A and supplement the forward wing set 526A. The removable training wing set 572 may include a relatively large training aft wing set 528B that is configured to connect to the body 530 and/or the training forward wing set 526B. The size, and hence drag, of the training aft wing set 528B may be so great that they may induce a large aftward shift along the body x-axis of the aerodynamic center of the aerial vehicle 508. Such a shift of the aerodynamic center of the aerial vehicle 508 may lead to such high static margin that as the aerial vehicle 508 is exposed to increasing flight speeds, the aerial vehicle 508 attitude is forced ever further into the local freestream velocity vectors. Embodiments including an oversized training aft wing set 528B may aid pilots, such as novice pilots who are learning how to convert flight modes. However, because the removable training wing set 572 can more than double the wetted area, the removable training wing set 572 is not generally suitable for high speed flight. Thus, in some embodiments, the removable training wing set 572 may be removed, for example, once the pilot gains experience and confidence with conversion. In some embodiments, the removable training wing set 572 may be a single structural component that is selectively connectable to the aerial vehicle 508 as a whole. In other embodiments, the removable training wing set 572 may have discrete components that a user may selectively apply to the aerial vehicle 508 for different training purposes and/or flight characteristics. For example, the training forward wing set 526B and the training aft wing set 528B may be applied and/or removed from the aerial vehicle 508 independently from one another. As with many training schemes, the training forward wing set 526B and the training aft wing set 528B may come in a variety of chords and spans so that the level of stability may be gradually reduced with increasing levels of pilot skill and confidence.

Figure 7:
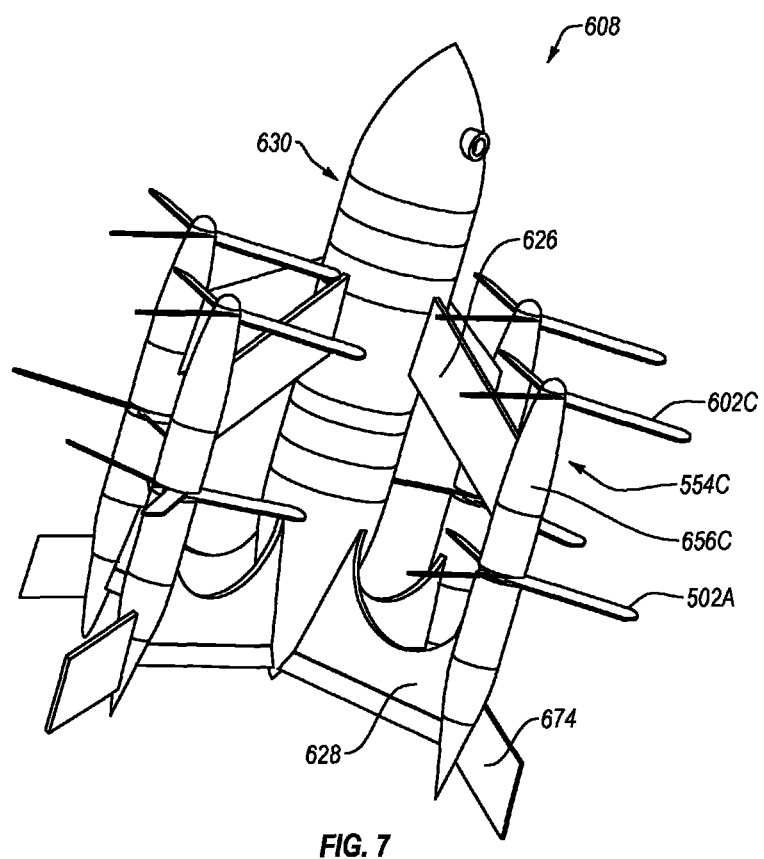
FIG. 7 is a perspective view of an embodiment of a convertible aerial vehicle with multiple sets of propellers and without an undercarriage, according to the present disclosure.

FIG. 7 illustrates yet another embodiment of an aerial vehicle 608 with the undercarriage assembly removed and a set of forward propellers 602C mounted forward of the forward wing set 626 and forward of the propellers 602A mounted between the forward wing set 626 and aft wing set 628. Forward propellers 602C, and associated motor assemblies 656C can be mounted to the body 630 and/or forward powerpods 654C and used to boost maximum flight speeds, both in hover flight and translational flight modes; however because the propellers lie outside of the protection of the space between the forward wing set 626 and aft wing set 628, this configuration may be reserved for more experienced pilots. The position of the forward propellers 602C may induce a power-on forward shift in effective aerodynamic center position and accordingly reduce the total static margin. In some embodiments, fixed or movable stabilizers 674 may be included for both stabilization and control.

Figure 8:
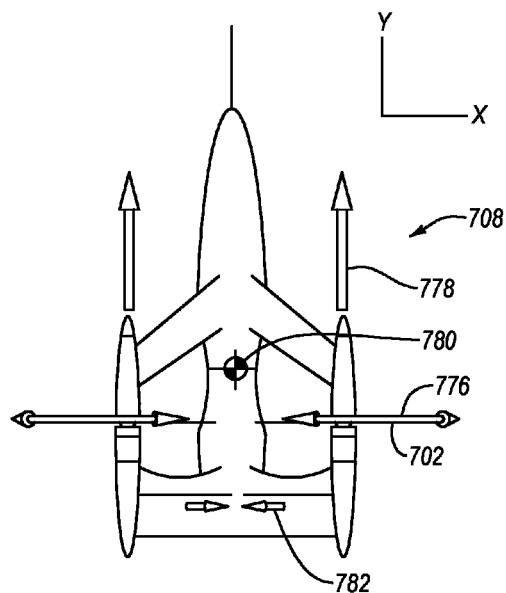
FIG. 8 is a side view of an embodiment of a convertible aerial vehicle along the body in a hover flight configuration illustrating pitch, roll and yaw moments and longitudinal body axis and transverse body axis translational force vectors, according to the present disclosure.

The embodiments of aerial vehicles described herein will have a high number of independent and dependent degrees of freedom with respect to a conventionally configured multi-propeller aircraft, helicopter, or airplane. FIG. 8 is a lateral view of an embodiment of an aerial vehicle 708 along the body y-axis illustrating the aerial vehicle 708 in hover flight. The aerial vehicle 708 may include a plurality of propellers 702 which may each generate a yawing moment 776. These yawing moments 776 are a function of propeller types, pitch angles, rotational speeds and directions which may be varied, from flight to flight or in-flight. As the propellers 702 are spun at different speeds relative to each other or their blade angles are pitched more or less relative to each other, the thrust vector 778 of each propeller 702 may be manipulated for control of moments about the center of mass 780 of the aerial vehicle 708. Turning vane flaps may generate elevator forces 782 in elevator-equivalent and rudder-equivalent directions.

These force vectors may be varied with respect to each other to generate pitching moments about the center of mass 780, either positive or negative. If the sum of the thrust vectors 778 from the propellers 702 on a first lateral side of the aerial vehicle 708 is greater than the sum of the thrust vectors 778 from the propellers 702 on a second lateral side of the aerial vehicle 708, then the aerial vehicle 708 pitches around the center of mass 780, providing all other force vectors remain unchanged. The elevator forces 782 are represented by the two visible components of those vectors. The elevator forces 782 may manipulate the aerial vehicle 708 in z-axis translational motions as well as generate pitching moments about the aircraft center of mass 780.

Figure 9:
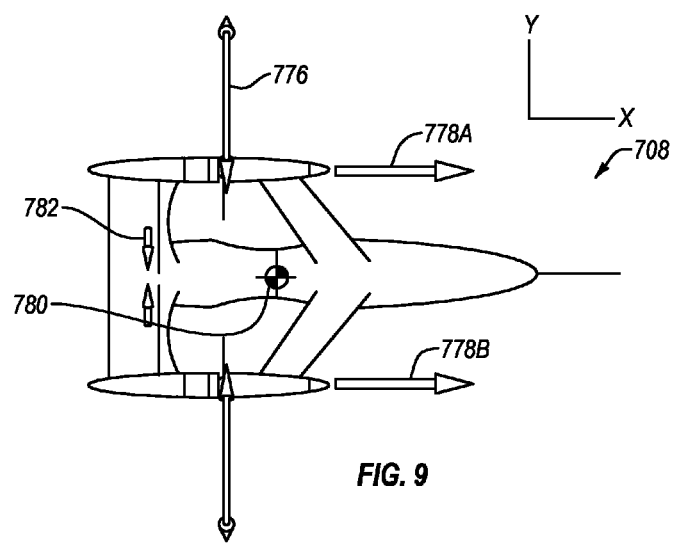
FIG. 9 is a side view of an embodiment of a convertible aerial vehicle in an airplane-mode illustrating pitch, yaw and roll moments and longitudinal body axis and transverse body axis translational force vectors, according to the present disclosure.

FIG. 9 is a top-view of the aerial vehicle 708 of FIG. 8 in fully-converted translational flight. As the sum of the thrust vectors 778A from the propellers 702 on the first lateral side of the aerial vehicle 708 becomes greater than the sum of the thrust vectors 778B from the propellers 702 on the second lateral side of the aerial vehicle 708, the aerial vehicle 708 will yaw clockwise as seen in this view about the aircraft center of mass 780. The elevator forces 782 may manipulate the aerial vehicle 708 in y-axis translational motions as well as generate yawing moments about the aircraft center of mass 780. These force differentials (i.e., pitch, roll, yaw) may be accomplished by, for example, varying propeller speeds and/or turning vane orientations as described herein.

Figure 10:
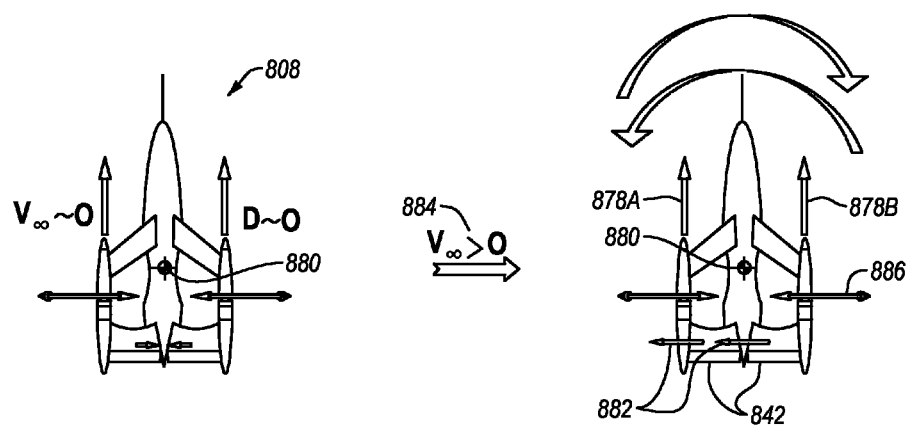
FIG. 10 illustrates an embodiment of a convertible aerial vehicle in quiescent hover flight and the physics of deck-level hovering flight during transition and/or when exposed to a lateral gust field.

FIG. 10 illustrates how an embodiment of an aerial vehicle 808 may maintain deck-level translations and equilibrium during relative movement of the aerial vehicle 808 and the surrounding air. The aerial vehicle 808 in a quiescent flight condition with a farfield freestream velocity near zero exhibits essentially no cross-flow drag, D~0. As the aircraft is exposed to a lateral flow speed induced by direct translation of the aerial vehicle 808 or a gust of air 884, a crossflow-drag component 886 will go to a non-zero value. To counter this crossflow drag component 886 the pilot and/or flight director may command the turning vane flaps 842 to generate countering lateral elevator forces 882. To maintain moment equilibrium about the center of mass 880, the thrust force of the windward propellers 878A may be reduced with respect to the thrust force of the leeward propellers 878B while the sum of thrust force of the windward propellers 878A and thrust force of the leeward propellers 878B is at the same level as when the aerial vehicle 808 was in hover flight with zero cross-flow. This differential in thrust force 878A, 878B may generate a counterclockwise moment about the center of mass 880 which may be used to exactly counter a clockwise moment generated by the elevator force 882 generated by the turning vane flaps 842. Accordingly, the aerial vehicle 808 may be kept in exact force and moment equilibrium with a level deck.

Figure 11:
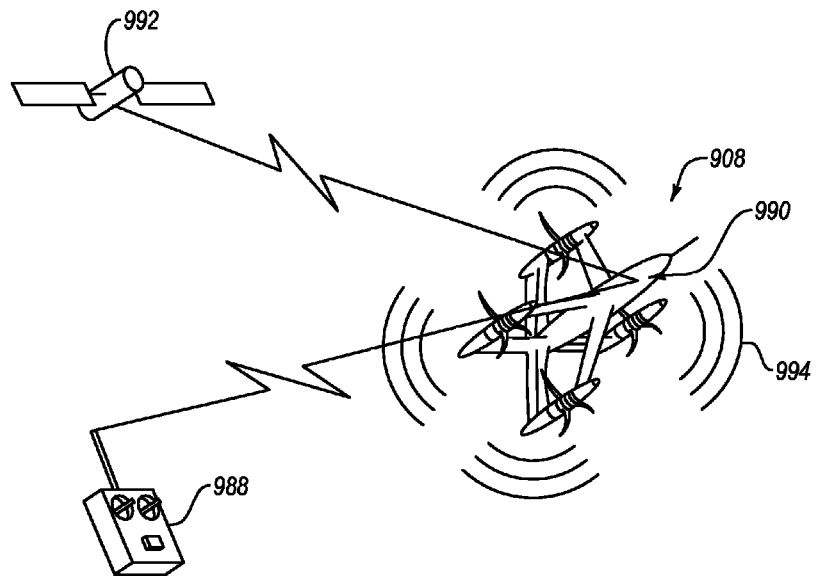
FIG. 11 schematically illustrates communication of pilot commands and/or other flight commands to an embodiment of a convertible aerial vehicle, according to the present disclosure.

FIG. 11 illustrates a plurality of guidance, navigation, and flight command signals that may be transmitted to an aerial vehicle 908. In some embodiments, a conventional radio controller 988 may be used to directly and/or indirectly communication pilot commands to the aerial vehicle 908 via a signal in the electromagnetic spectrum. The pilot commands may be transmitted to a receiver unit 990 within the aerial vehicle 908 which may be attached to one or more antennae. In other embodiments, one or more satellites 992 can send a number of electromagnetic signals to the aerial vehicle 908 so as to provide spatial orientation to the receiver unit 990. The aerial vehicle 908 may also be fitted with a plurality of proximity sensors 994 operating in acoustic and/or radio frequencies using electromagnetic waves or optical or infrared signals. These signals may be used to increase situational awareness for pilot-commanded flight and/or used as part of an automatic or semi-automatic flight control system.

Figure 12:
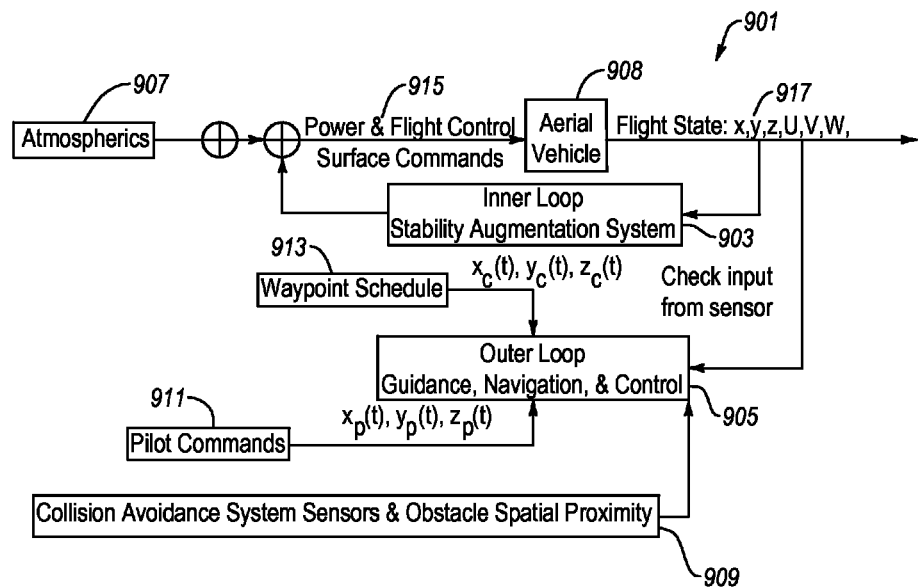
FIG. 12 illustrates a schematic drawing of an embodiment of stability and control loop architecture, according to the present disclosure.

FIG. 12 illustrates an embodiment of a data flowchart 901 depicting data flow through a flight director with inner loop stability augmentation system (SAS) 903 and an outer loop guidance, navigation, and control (GNC) system 905. A plurality of sensors may be used to determine atmospherics information 907 and provide the atmospherics information 907 to the flight director. One or more onboard sensors in a collision avoidance and obstacle spatial proximity system may also provide collision avoidance information 909 and aid in establishing aircraft and operator situational awareness. Collision avoidance information 909 may be supplied with pilot commands 911 to the outer GNC system 905 which feeds data to the aerial vehicle only upon mixing within an inner SAS 903. The outer GNC system 905 may receive a waypoint schedule 913 that is at least partially provided by communication with one or more satellites 992, described in relation to FIG. 11. The outer GNC system 905 and inner SAS 903 may provide power and flight control surface commands 915 to the aerial vehicle 908 to move the aerial vehicle 908 according to the pilot commands 911 in light of the atmospherics information 907, collision avoidance information 909, and the necessary modifications to maintain stability according to the inner SAS 903. The aerial vehicle 908 may move in the intended direction and relay back flight state information 917 to the inner SAS 903 and the outer GNC system 905. In some embodiments, the flight state information may include pitch, orientation, speed, acceleration, inertial moments, altitude, position, other values, or combinations thereof.

Figure 13:
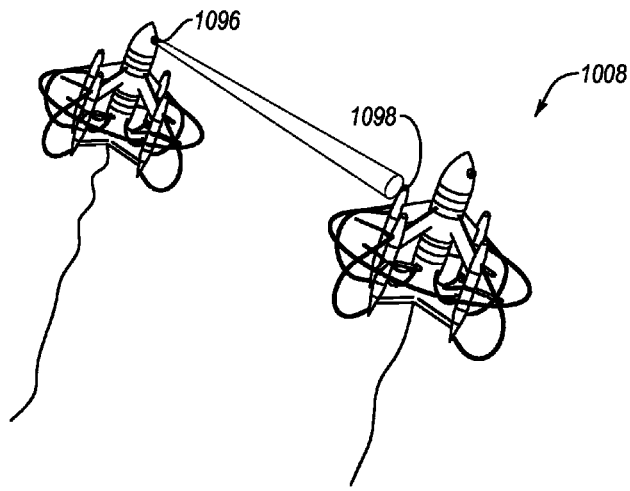
FIG. 13 illustrates a pair of embodiments of aerial vehicle toys engaged in ribbon-cutting and laser-tag dogfight flight, according to the present disclosure.

At least one embodiment of an aerial vehicle toy may be used in a number of aerial games in addition to simple acrobatics which can be commanded. FIG. 13 shows a pair of aerial vehicles 1008 engaging in combat using a form of radio frequency, optical, infrared, UV, or other electromagnetic beam targeting an opposing aircraft. As the beam originates from an emitter 1096 from the pursuing aerial vehicle 1008, travels through space and hits the opposing aerial vehicle 1008 on a receiver 1098. The result of a beam strike could be the emission of a sound signaling a hit, a loss of power, a prescribed aircraft maneuver and/or loss of power or complete motor shut-down.

Figure 14:
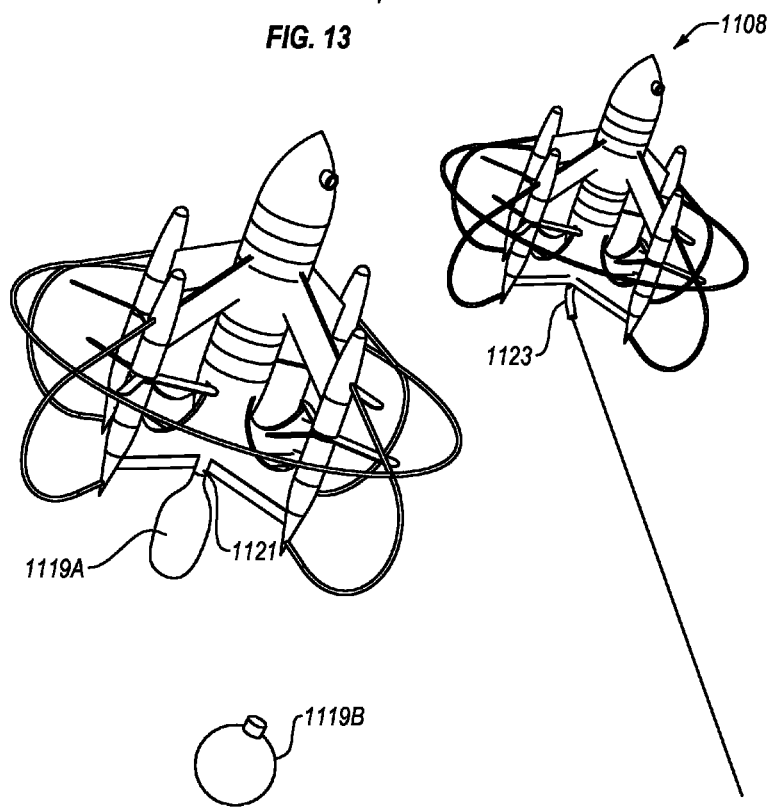
FIG. 14 is a perspective view of a pair of embodiments of convertible aerial vehicles engaging in lofting and deploying a cargo, according to the present disclosure.

Other activities may include using an embodiment of an aerial vehicle 1108 to loft a given payload 1119A as shown in FIG. 14. Such a payload may be any form of harmless game-related substance and under current FAA rules may be flown indoors. The payload 1119B in freefall may be safe to humans upon impact, such as a water-balloon, a shaving-cream filled balloon or a bag of flour. When mounted to the aircraft, the payload 1119A may be released by a remotely controlled release mechanism 1121. Other payloads may include liquids held in a reservoir which may be ejected from a nozzle 1123 a given distance like shaving cream or other effluents, such as SILLY STRING. In some embodiments, such a reservoir may be located within a body 1130 of the aerial vehicle 1108 and may be ejected from the nozzle 1123 upon receiving a command from the pilot or other operator.

Figure 15:
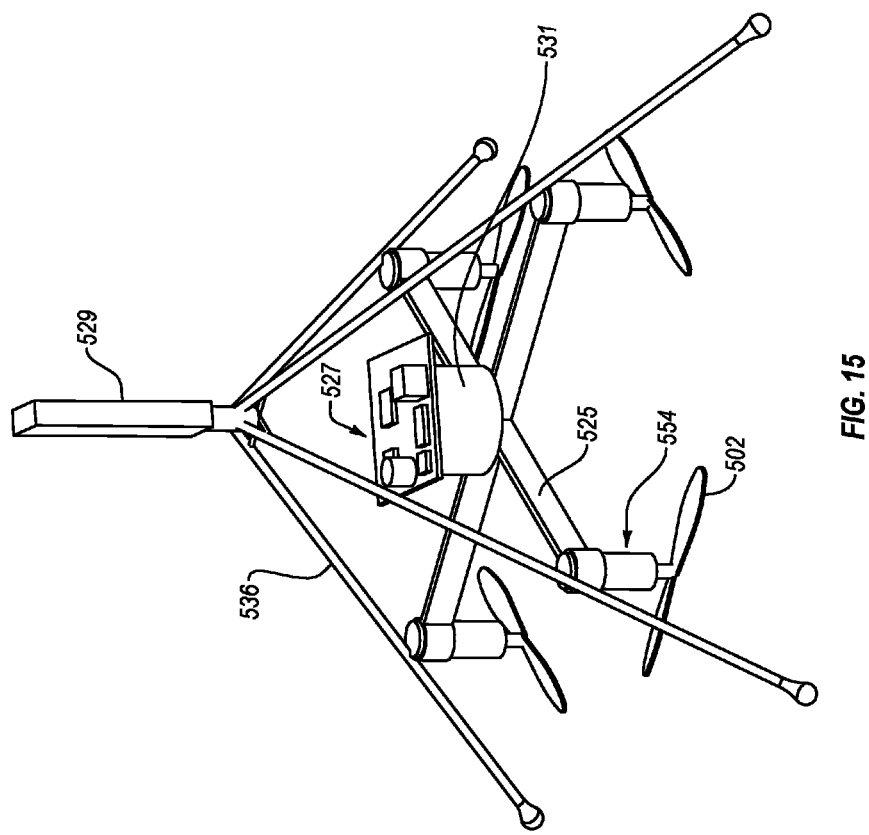
FIG. 15 is a perspective view of an embodiment of a core of a convertible aerial vehicle with structural leading wing edges, according to the present disclosure.

FIG. 15 illustrates the internal core of the aerial vehicle 508 described in relation to FIG. 6. The internal core may include an undercarriage assembly 536 and a support member 525. The undercarriage assembly 536 and support member 525 may provide a structural framework upon with the plurality of powerpods 554 and propellers 502 may be mounted. The core may include a flight director 527 in electrical communication with a plurality of sensors and/or communication modules to convert pilot commands and flight state information into flight commands, as described in relation to FIG. 12. The core may include an energy storage device 529 in electrical communication with the flight director 527, the plurality of sensors, emitters, the communication module, the plurality of powerpods 554, any other devices described herein, or combinations thereof.

In other embodiments, the flight director 527 may include an inertial measuring unit (IMU) which will send signals to a comparator which will mix motor command signals which will be amplified by the power electronics assembly. The power electronics assembly will be used to drive indicator sound generators and/or lights to demonstrate to the operator different states of readiness and/or flight command levels. The power electronics assembly will also send power to the powerpods 554.

The flight director 527 may be shock mounted on a piece of mounting material 531 which is designed so as to provide both equivalent spring stiffness and damping so as to induce stable, controllable flight. The undercarriage assembly 536 forms a straight structural triangle stretching between the energy storage device 529 and the support member 525. The mounting material 531 may interface with the support member 525. The support member 525 may have a light fill center or closed center. In the case of a closed center, powerpods 554 are connected at some distance from the center of the support member 525. The support member 525 may include or be made of any comparatively stiff material like cast nylon or graphite-epoxy composite, which may surround softer material like foam, balsa or honeycomb or no material at all for an open configuration.

Figure 16:
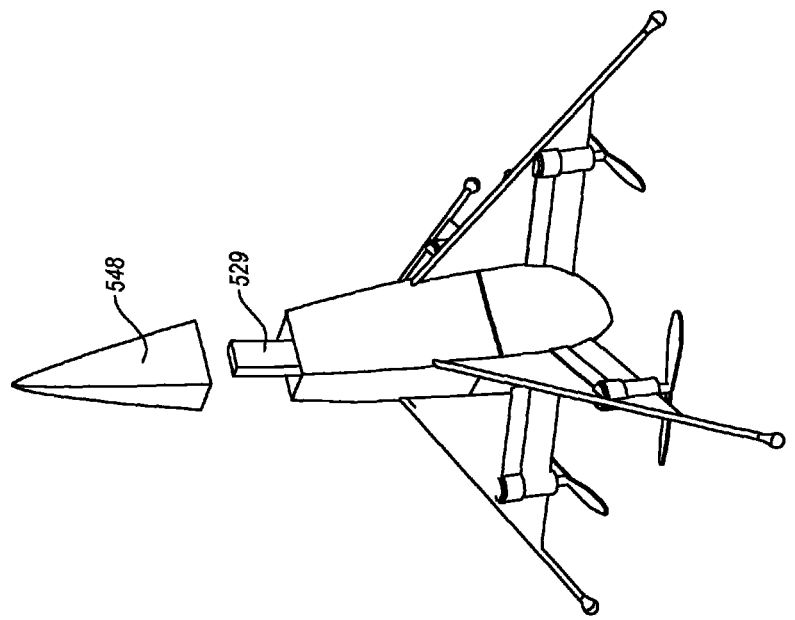
FIG. 16 is a perspective view of an embodiment of a convertible aerial vehicle including the core of FIG. 15 in an assembled and partially disassembled form, according to the present disclosure.
Figure 16:
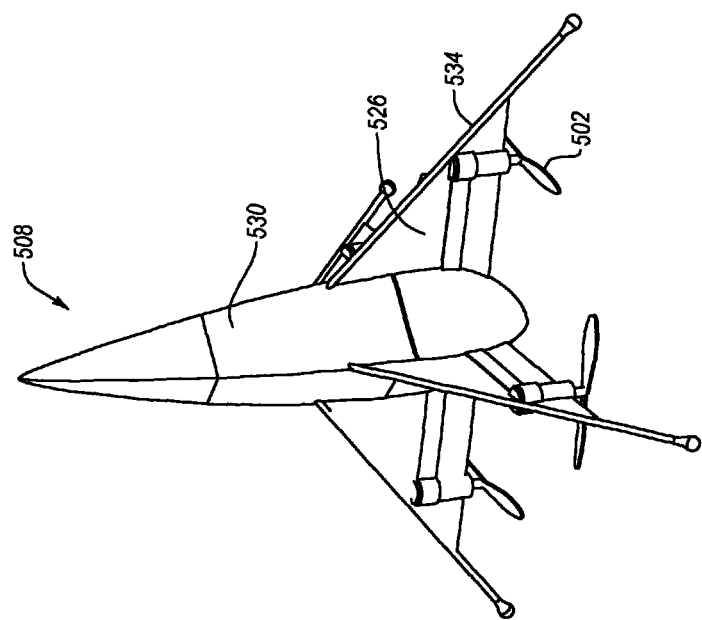

FIG. 16 shows the aerial vehicle 508 with a forward wing set 526 and body 530 affixed to the core of FIG. 15 and the aerial vehicle 508 with a nose 548 removed to provide access to the energy storage device 529. The nose 548 may be polygonal, oval, irregular, or circular in cross section and may be composed of materials which are capable of accepting multiple impact loads from crashing into surfaces soft and hard. The nose 548 may be filled with energy absorbing foam and may be made from sheet stock. The nose 548 may be designed to aerodynamically shield the energy storage device 529 and seat over the forward portion of the body 530, which, in turn may have a polygonal, oval, irregular or circular cross section. The body 530 transfers forward body structural loads, air, and D'Alembert's forces aft towards the forward sections of the undercarriage assembly 536.

Because the undercarriage assembly 536 may be stiffer, stronger and heavier per unit volume than the lifting surfaces (i.e., forward wing set 526) which may be made from materials like polymer or metal honeycomb, foam, foil, paper or balsa, they have several effects on the section and whole surface aeroelastic stability. Because the lifting surfaces can be made from comparatively lightweight materials, a longitudinal section across the wing would be composed of a stiff, strong, comparatively heavy leading edge 534 component as the undercarriage assembly 536 also forms the leading edge 534 of the forward wing set 526.

While in some embodiments, the undercarriage assembly 536 may be removable, the undercarriage assembly 536 may be integrated into the primary structure of the aerial vehicle 508. Accordingly, the undercarriage assembly 536 may be a load-bearing member through which landing, takeoff, flight, other loads, or combinations thereof are passed. Because a given longitudinal section of the forward wing set 526 and undercarriage assembly 536 shows a leading edge 534 reinforced by the undercarriage assembly 536, and the density of the undercarriage assembly 536 may be as much as two orders of magnitude greater than the density of the rest of the forward wing set 526, the section center of gravity is shifted forward in front of the section aerodynamic center, which, sub-sonically, will be close to the quarter-chord. Similarly, the torsional and flexural stiffnesses of the undercarriage assembly 536 may be greater than the torsional and flexural stiffnesses of the rest of the forward wing set 526, which trails the undercarriage assembly 536 in the longitudinal direction. The effect of this geometric arrangement on sectional elastic axis is similar to that of the effect on the section center of gravity. Because the undercarriage assembly 536 is often two to five orders of magnitude greater in flexural and torsional stiffness than the rest of the forward wing set 526 which trails it, the elastic axis position quite often is far in front of the quarter-chord of the section, which is approximately the position of the section aerodynamic center. At least partially due to this structural arrangement, both the section center of gravity and the elastic axis may be positioned in front of the section aerodynamic center.

Figure 17:
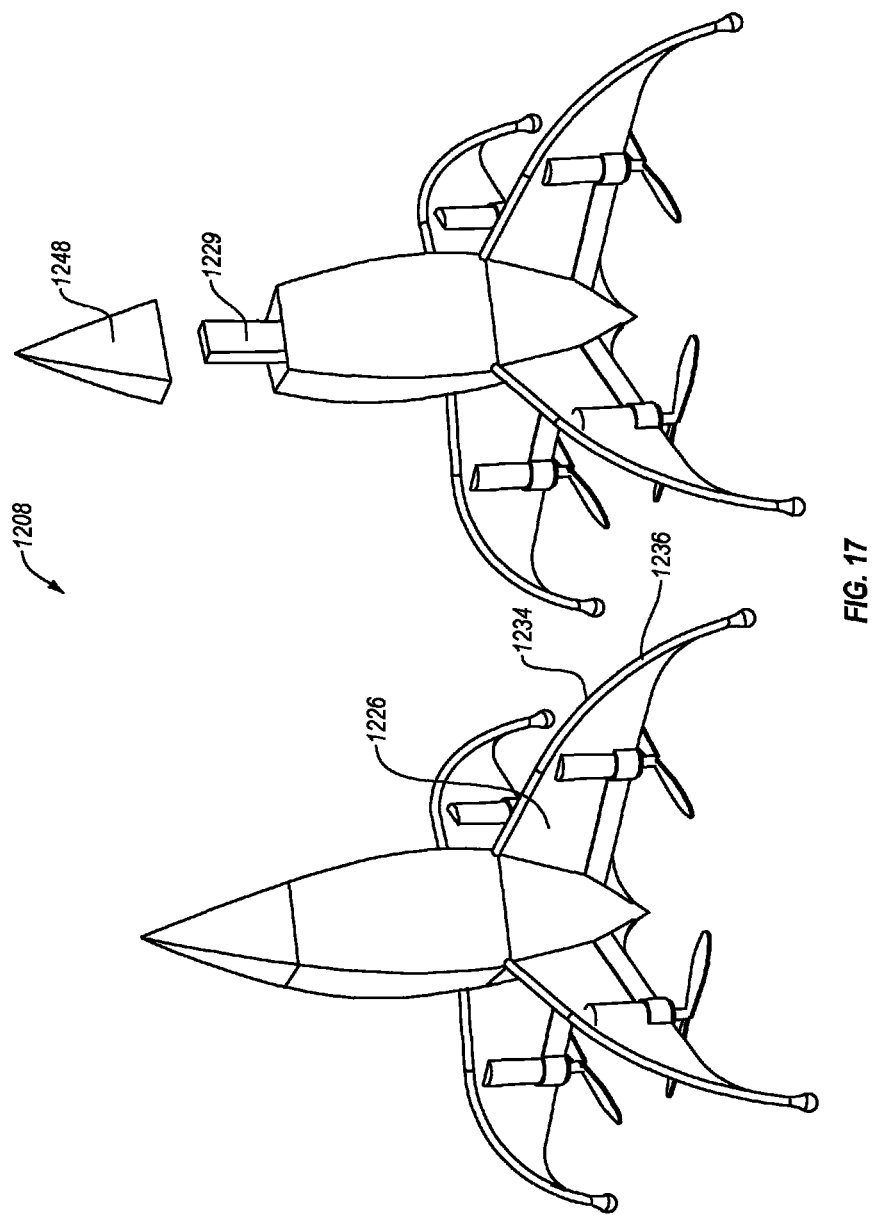
FIG. 17 is a perspective view of an embodiment of a convertible aerial vehicle with a curved leading wing edge in an assembled and partially disassembled form, according to the present disclosure.

While the undercarriage assembly and leading edge of the wing set have been described as being substantially straight, the leading edge of the wing set may be or include curved elements as shown in FIG. 17. An embodiment of an aerial vehicle 1208 having a curvilinear undercarriage assembly 1236 may shrink the total aft body length by as much as a factor of two while maintaining an equivalent surface area of a forward wing set 1226. The leading edge 1234 may include a curve in a range having upper and lower values including any of 10°, 20°, 30°, 40°, 50°, 60°, 70°, 80°, 90°, or any values therebetween. For example, the leading edge 1234 may curve between 10° and 90°. In other examples, the leading edge 1234 may curve between 20° and 50°. In yet other examples, the leading edge 1234 may curve about 30°. Similarly to FIG. 16, FIG. 17 depicts the aerial vehicle 1208 with a removable nose 1248 removed to allow access to an energy storage device 1229 and/or other electronics.

Figure 18:
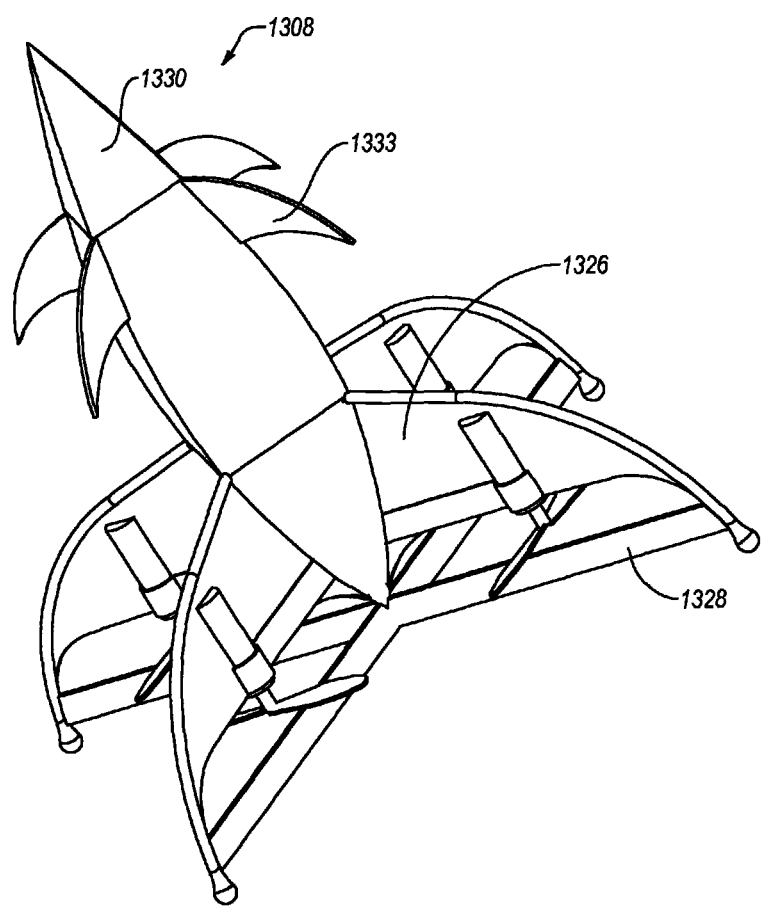
FIG. 18 is a perspective view of an embodiment of a convertible aerial vehicle with a canard wing set, according to the present disclosure.

FIG. 18 depicts an embodiment of an aerial vehicle 1308 including a canard wing set 1333 mounted to a body 1330 of the aerial vehicle 1308. An aerial vehicle 1308 including curvilinear forward surfaces and/or empennage pieces such as the canard wing set 1333 in addition to the forward wing set 1326 and aft wing set 1328, the aerodynamic center may be positioned precisely for maintenance of proper stability and maneuverability when converted from hover flight to translational flight.

Figure 19:
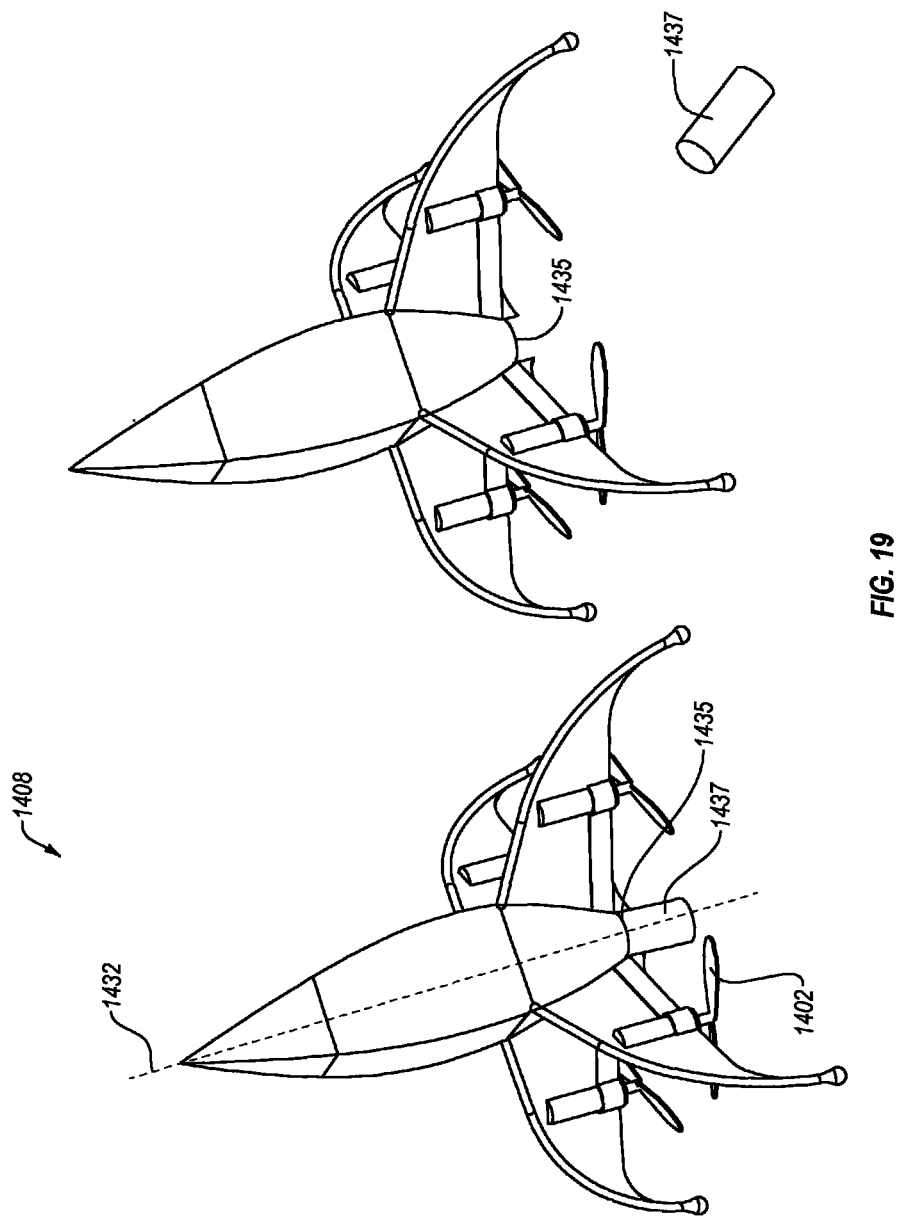
FIG. 19 is a perspective view of an embodiment of a convertible aerial vehicle with a rocket propulsor mounted in the body, according to the present disclosure.

FIG. 19 depicts an embodiment of an aerial vehicle 1408 including a plurality of types of propulsors. The aerial vehicle 1408 may include at least three aerodynamic propulsors of a first type, such as the propellers 1402 described herein, in combination with a propulsor of a second type. In some embodiments, the aerial vehicle 1408 may include at least three propellers 1402 located equidistant from a longitudinal axis 1432 of the aerial vehicle 1408 with a central mounting channel 1435 that may house a rocket propulsor 1437. The rocket propulsor 1437 may be a solid fuel rocket, a liquid fuel rocket, staged rocket, other type of rocket, or combinations thereof. In some embodiments, the rocket propulsor 1437 may be mounted forward of the at least three propellers 1402. In other embodiments, the rocket propulsor 1437 may be positioned such that an exhaust path of the rocket propulsor 1437 may not overlap with the at least three propellers 1402.

The central mounting channel 1435 may be constructed of heat-resistant materials so as to resist the effects of ejection charges of the rocket propulsor 1437 at the conclusion of core burn. This configuration of rocket propulsor 1437 may be initiated by on-board or ground-based electronics and/or power and/or may be fired by a fuse type assembly. After the rocket propulsor 1437 is consumed, a recoil charge may or may not be used to eject the entire rocket propulsor 1437 or it may be retained for the rest of the flight. The central mounting channel 1435 may place the rocket thrust vector straight through the aircraft center of mass and along the longitudinal axis 1432 for maintenance of flight stability upon motor firing.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Although the preceding description has been described herein with reference to particular means, materials and embodiments, it is not intended to be limited to the particulars disclosed herein; rather it extends to all functionally equivalent structures, methods and uses, such as are within the scope of the appended claims.

What is claimed is:

1. An aerial vehicle, comprising:
 a body having a central longitudinal body axis, the body including:
  a plurality of forward wings, each forward wing of the plurality of forward wings extending in a forward wing plane that includes the central longitudinal body axis, and
  a plurality of aft wings, each aft wing of the plurality of aft wings extending in an aft wing plane that contains the central longitudinal body axis;
 at least one motor supported by the body; and
 at least three aerodynamic propulsors driven by the at least one motor, the at least three aerodynamic propulsors being located between the plurality of forward wings and the plurality of aft wings and lying in a horizontal plane that is perpendicular to the central longitudinal body axis, the at least three aerodynamic propulsors being configured to provide translational control about the central longitudinal body axis, and pitch, yaw, and roll control.

2. The aerial vehicle of claim 1, the body further comprising a longitudinally forward, transversely central nose section that terminates in an aerodynamically shaped nose.

3. The aerial vehicle of claim 1, further comprising a removable undercarriage assembly attached to the body such that major structural loads are delivered to the plurality of forward wings, and which extends beyond a radially outermost point of the at least three aerodynamic propulsors from the central longitudinal body axis.

4. The aerial vehicle of claim 3, further comprising landing pads on a radially outwardmost end of the undercarriage assembly from the central longitudinal body axis.

5. The aerial vehicle of claim 1, further comprising a plurality of turning vane flaps to provide pitch, yaw, and roll control and translational flight control along transverse and rotational body axes relative to the central longitudinal body axis.

6. The aerial vehicle of claim 1, wherein the plurality of forward wings are structurally connected to the body and the plurality of aft wings are structurally connected to the body, and wherein structural loads are transferred from the plurality of forward wings to the body and structural loads are transferred from the plurality of aft wings to the body.

7. The aerial vehicle of claim 1, further comprising a communication module capable of receiving a command signal from a human-operated transmitter or satellite and providing the command signal to the at least one motor.

8. The aerial vehicle of claim 1, further comprising an undercarriage defining a propulsor cage between the plurality of forward wings and the plurality of aft wings to mitigate object strikes against at least one of the aerodynamic propulsors.

9. The aerial vehicle of claim 1, further comprising a flight director including an inner loop stability augmentation system and outer loop guidance, navigation, and control system which senses both spatial orientation and location and issues flight control commands to counter deviations from commanded flight paths.

10. The aerial vehicle of claim 1, further comprising an emitter configured to emit beams operating in any radio frequency, infrared, ultraviolet or visible wavelength and a sensor configured to sense the beams.

11. An aerial vehicle, comprising:
 a body having a central longitudinal body axis, the body including:
  a plurality of forward wings, each forward wing of the plurality of forward wings extending in a forward wing plane that includes the central longitudinal body axis, and
  a plurality of aft wings, each aft wing of the plurality of aft wings extending in an aft wing plane that contains the central longitudinal body axis;
 at least three aerodynamic propulsors, each of the aerodynamic propulsors having a motor associated therewith and driving the aerodynamic propulsor, the at least three aerodynamic propulsors being located between the plurality of forward wings and the plurality of aft wings and lying in a horizontal plane that is perpendicular to the central longitudinal body axis, the at least three aerodynamic propulsors being configured to provide translational control about the central longitudinal body axis and pitch, yaw, and roll control;

a communication module capable of receiving a command signal from a human-operated transmitter or satellite and providing the command signal to at least one of the motors; and a flight director in data communication with at least one of the motors associated with the at least three aerodynamic propulsors, the flight director having a stability augmentation system configured to receive flight state information and pilot commands and to output flight control commands based at least partially upon the flight state information and pilot commands.

12. The aerial vehicle of claim 11, further comprising a plurality of turning vane flaps to provide pitch, yaw, and roll control and translational flight control along transverse and rotational body axes, the plurality of turning vane flaps operably connected to vane motors, wherein the vane motors are in data communication with the flight director.

13. The aerial vehicle of claim 12, further comprising orientation and acceleration sensors in data communication with the flight director, the orientation and acceleration sensors configured to provide flight state information to the stability augmentation system.

14. The aerial vehicle of claim 12, further comprising a proximity sensor in data communication with the flight director, the proximity sensor configured to detect a direction of and a distance to an object relative to the body.

15. An aerial vehicle, comprising:
a body having a central longitudinal body axis and a forward end and an aft end, the body including:
a plurality of forward wings, each forward wing of the plurality of forward wings extending in a forward wing plane that includes the central longitudinal body axis, wherein each wing of the plurality of forward wings have a structural leading edge that is configured to structurally support landing gear and extends through a radially outwardmost point of the aerial vehicle, and a plurality of aft wings, each aft wing of the plurality of aft wings extending in an aft wing plane that contains the central longitudinal body axis;

at least three aerodynamic propulsors, each of the aerodynamic propulsors having a motor associated therewith and driving the aerodynamic propulsor, the at least three aerodynamic propulsors being located longitudinally between the plurality of forward wings and the plurality of aft wings, lying in a horizontal plane that is perpendicular to the central longitudinal body axis, and located within the radially outwardmost point such that the structural leading edge forms a propulsor cage that provides protection for the aerodynamic propulsors from impact, the at least three aerodynamic propulsors being configured to provide translational control about the central longitudinal body axis and pitch, yaw, and roll control; and a flight director in data communication with each of the motors associated with the at least three aerodynamic propulsors, the flight director having a stability augmentation system configured to receive flight state information and pilot commands and to output flight control commands based at least partially upon the flight state information and pilot commands.

16. The aerial vehicle of claim 15, wherein at least a portion of the structural leading edge is curved.

17. The aerial vehicle of claim 15, wherein the body further includes a cargo volume, the cargo volume configured to deploy at least part of a cargo contained therein during flight.

18. The aerial vehicle of claim 15, wherein the plurality of forward wings and the plurality of aft wings comprise removable training wings.

* * * * *

UNITED STATES PATENT AND TRADEMARK OFFICE
CERTIFICATE OF CORRECTION

PATENT NO. : 9,878,257 B2
APPLICATION NO. : 14/734864
DATED : January 30, 2018
INVENTOR(S) : Ronald M. Barrett et al.

It is certified that error appears in the above-identified patent and that said Letters Patent is hereby corrected as shown below:

In the Specification

Column 1
Line 2, include the following paragraph:
STATEMENT OF GOVERNMENT INTEREST
This invention was made with government support under DTOS59-06-G-00047 awarded by the Department of Transportation. The government has certain rights in the invention.

Signed and Sealed this
Eighteenth Day of September, 2018

Andrei Iancu
*Director of the United States Patent and Trademark Office*